(12) United States Patent
Dolan et al.

(10) Patent No.: US 8,057,145 B2
(45) Date of Patent: Nov. 15, 2011

(54) RADIALLY EXPANDING BOLT ASSEMBLY

(75) Inventors: Michael F. Dolan, Kenilworth, NJ (US);
Ulrich Oehms, Kottenheim (DE)

(73) Assignee: Jetyd Corp., Mahwah, NJ (US)

( * ) Notice: Subject to any disclaimer, the term of this patent is extended or adjusted under 35 U.S.C. 154(b) by 280 days.

(21) Appl. No.: 12/425,518

(22) Filed: Apr. 17, 2009

(65) Prior Publication Data
US 2009/0324361 A1 Dec. 31, 2009

Related U.S. Application Data

(60) Provisional application No. 61/075,791, filed on Jun. 26, 2008.

(51) Int. Cl.
*F16B 13/12* (2006.01)
(52) U.S. Cl. .................................. 411/57.1; 411/24
(58) Field of Classification Search ............ 411/60.1, 411/60.2, 75, 79, 21, 24, 26, 27, 34, 57.1
See application file for complete search history.

(56) References Cited

U.S. PATENT DOCUMENTS

| | | | | | |
|---|---|---|---|---|---|
| 1,596,856 | A | * | 8/1926 | Setlow | 411/75 |
| 1,767,019 | A | * | 6/1930 | Sergeeff | 411/57.1 |
| 4,636,123 | A | * | 1/1987 | Herb | 411/55 |
| 4,743,138 | A | * | 5/1988 | Goy | 403/337 |
| 6,629,808 | B1 | * | 10/2003 | Martin et al. | 411/24 |
| 2003/0108398 | A1 | * | 6/2003 | Sathianathan | 411/60.1 |

* cited by examiner

*Primary Examiner* — Gary Estremsky
(74) *Attorney, Agent, or Firm* — Michael J. Striker

(57) ABSTRACT

A radially expanding bolt assembly has a hollow element insertable into a hole of an object and having an inner surface with at least one inner surface portion which is tapered, an expanding element insertable in the hollow element and having an outer surface with at least one outer surface portion which is tapered and cooperates with the inner tapered surface portion of the hollow element, additional elements for displacing the expanding element in opposite axial directions for tightening and loosening the bolt assembly, and a washer positionable between the object and one of the additional elements at one of the axial ends, so that the one additional element displaces the expanding element in one axial direction and due to cooperation of the tapered surface portions expands the hollow element to clamp it in the hole of the object, while the other additional element displaces the expanding element in an opposite axial direction and the tapered surface portions disengage from one another so that the hollow element contracts and the radially expanding bolt assembly can be removed from the hole of the object.

9 Claims, 2 Drawing Sheets

RADIALLY EXPANDING BOLT ASSEMBLY

CROSS-REFERENCE TO RELATED APPLICATION

This application claims the benefit of priority of U.S. provisional patent application Ser. No. 61/075,791 filed on Jun. 26, 2008 under 35 USC 119(e). The subject matter of the aforesaid U.S. provisional patent application is further explicitly incorporated herein by reference thereto.

BACKGROUND OF THE INVENTION

The present invention relates to a bolt assembly, and in particular to a radially expanding bolt assembly.

Radially expansible bolt assemblies are known in the art. The known radially expanding bolt assembly includes an outer tubular expansible element formed as a sleeve with an inner tapered portion and a mating inner expanding element formed as an inner stud with an outer tapered portion cooperating with the tapered portion of the sleeve. The outer sleeve is inserted in a hole of an object to be tensioned, for example two adjoining flanges to be connected with one another. After this, the inner stud is inserted into the outer sleeve and pulled by external means to force the tapered portions to slide over one another and therefore to expand the outer sleeve.

Presently, hydraulic tools or a plurality of jack screws are used as external means for applying a tensile load to the radially expanding bolt assembly. It is believed that the existing radially expanding bolt assemblies can be further improved.

SUMMARY OF THE INVENTION

Accordingly, it is an object of the present invention to provide a radially expanding bolt assembly which is a further improvement of the existing assemblies of this type.

In keeping with these objects and with others which will become apparent hereinafter, one feature of the present invention resides, briefly stated, in a radially expanding bolt assembly, comprising a hollow element insertable into a hole of an object, having an axis and expansible in a radial direction, said hollow element having an inner surface with at least one inner surface portion which is tapered; an expanding element insertable in said hollow element and having an outer surface with at least one outer surface portion which is tapered, cooperating with said inner tapered surface portion of said hollow element, said expanding element having two opposite axial ends each engageable with an additional element configured for displacement of said expanding element in opposite axial directions for tightening the bolt assembly and for loosening the bolt assembly correspondingly; and a washer positionable between the object and one of the additional elements at one of said axial ends, so that said one additional element displaces said expanding element in one axial direction and due to cooperation of said inner and outer tapered surface portions expands said hollow element to clamp it in the hole of the object, while the other additional element displaces said expanding element in an opposite axial direction and said inner and outer tapered surface portions disengage from one another so that said hollow element contracts and the radially expanding bolt assembly can be removed from the hole of said object.

Another feature of the present invention resides, briefly stated, in that the expanding element has engaging formations provided on the opposite axial ends and engageable by the additional elements.

A further feature of the present invention resides in that the washer is non-rotatably connected with one axial end of the hollow element, and means is provided for non-rotatably connecting the washer with the one axial end of the hollow element.

A further feature of the present invention resides in that the washer has means for engaging by a tool used for turning of the one additional element and absorbing a reaction force generated during application of an action force by the tool to the one additional element.

A further feature of the present invention resides in that the hollow element at the opposite axial end has a radially projecting portion.

A further feature of the present invention resides in that the projecting portion is provided with means for engaging by a tool to absorb a reaction force generated during the application of an action force by the tool to the other additional element for displacing the expanding element in the opposite axial direction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
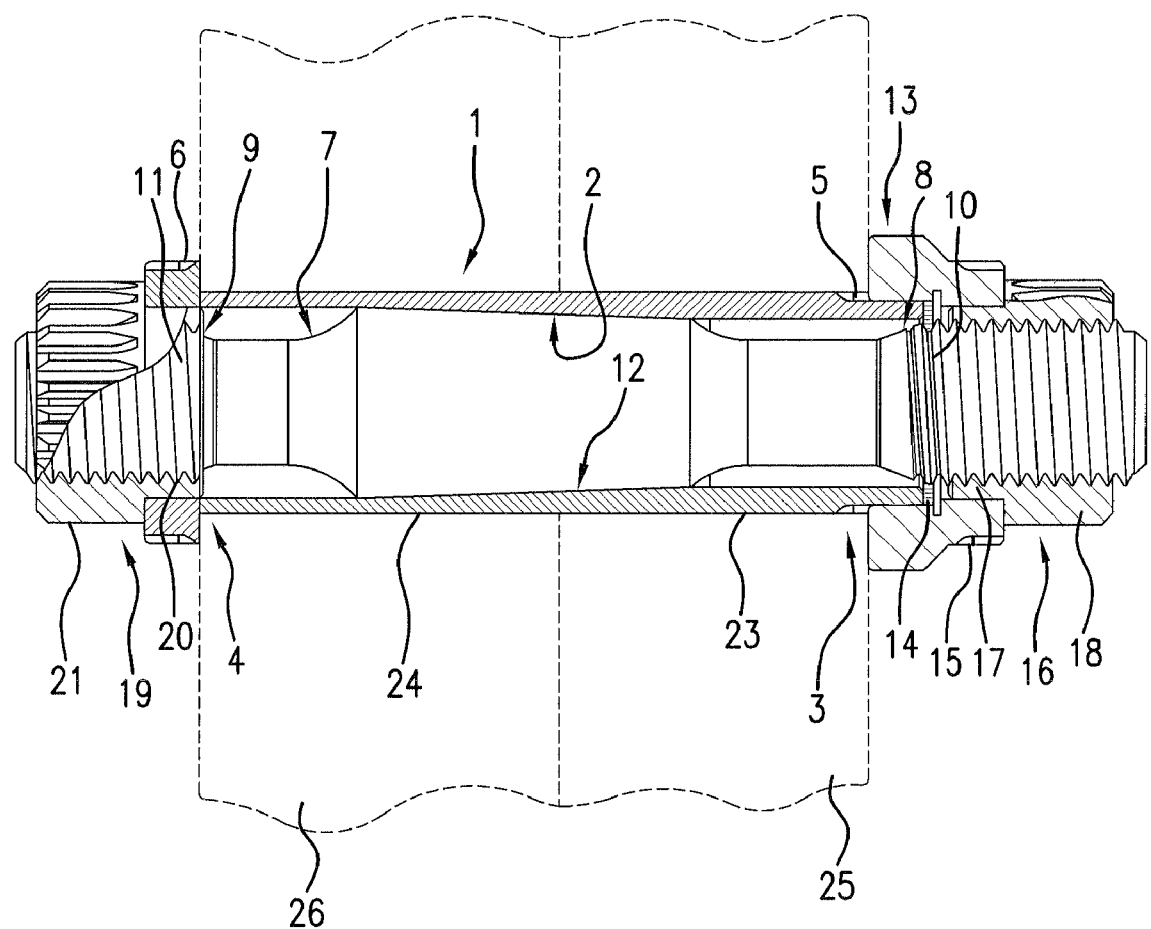
FIG. 1 is a view showing a cross section of a radially expanding bolt assembly in accordance with the present invention in cooperation with an object, for which it is used.
Figure 2:
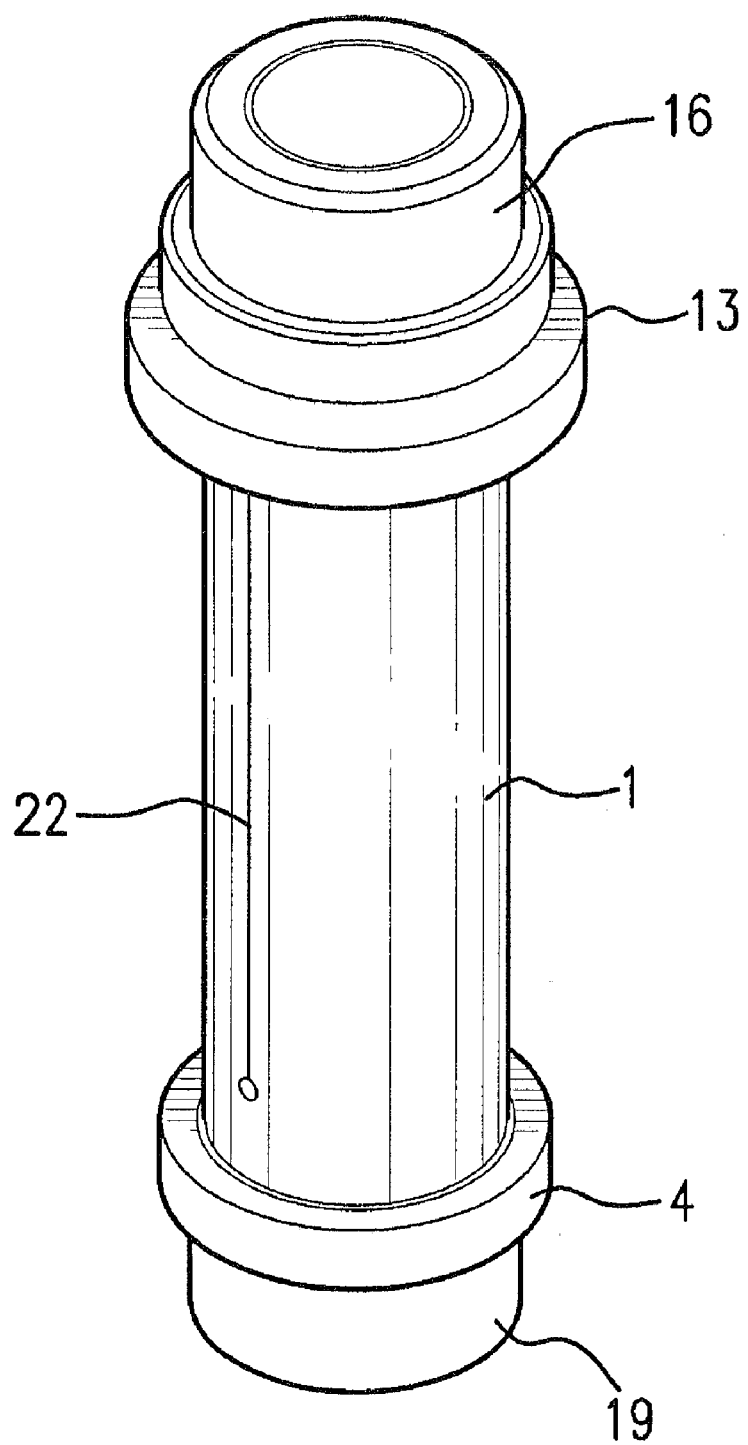
FIG. 2 is a perspective view of the radially expanding bolt assembly in accordance with the present invention.

A radially expanding bolt assembly of the present invention includes an outer hollow tubular member which is formed as a sleeve (1). The sleeve (1) has an outer cylindrical surface, and also an inner surface which includes at least one tapered portion (2). The sleeve (1) has an axis (2) and two axial ends (3, 4). The axial end (3) of the sleeve (2) is provided with engaging formations, formed for example as axially extending splines, or a hexagonal surface, or a star-shaped surface, or other polygonal formations (5), while the opposite axial end (4), which is formed as a radially projecting flange, also has engaging formations, which also can be formed for example as axially extending splines or a hexagonal surface, or a star-shaped surface, or other polygonal formations (6), for the purposes which will be explained hereinbelow.

The radially expanding bolt assembly further has an expanding member which is formed with an inner stud (7). The stud (7) has two opposite axial ends (8, 9) each provided with engaging formations, for example, threads (10, 11), for the purposes which will be explained hereinbelow. The stud (7) has an outer surface with at least one portion (12) which is tapered substantially in correspondence with the tapered portion (2) of the inner surface of the sleeve (1).

The radially expanding bolt assembly in accordance with the present invention further has a washer which is identified with reference numeral (13). The washer (13) has an inner surface provided with inner spines or a hexagonal surface, or a star-shaped surface, or other polygonal formations (14) which are engageable with the outer polygonal formations (5)

of the sleeve (1) so as to connect the washer (13) with a sleeve (1) non-rotatably around an axis (A). The washer (13) further has outer engaging formations, formed for example as outer axially extending splines, or a hexagonal surface, or a star-shaped surface, or other polygonal formations (15) to be engaged by a tool which tightens or loosens the bolt assembly.

A stepped nut (16) has a portion insertable into an opening of the washer (13) and having an inner thread (17) engageable with the outer thread of the stud (7). The nut (16) also has an outer portion provided with a plurality of axially extending splines or a hexagonal surface, or a star-shaped surface, or other polygonal formations (18). Another nut (19) has a portion insertable into the opposite end of the sleeve (1) and having an inner thread (20) engageable with the outer thread on the opposite end of the stud (7). The nut (19) also has an outer portion provided with a plurality of axially extending splines, or a hexagonal surface, or a star-shaped surface, or other polygonal formations (21).

The sleeve (1) is expansible in a radial direction. This can be achieved by making the sleeve (1) with a thin stretchable wall, by providing longitudinal slots (22) in it, etc.

The radially expanding bolt assembly in accordance with the present invention operates in the following manner:

The outer sleeve (1) first passes through into inner holes (23, 24) of an object composed of two flanges (25, 26) to be aligned and fixed with one another. Then the washer (13) is fitted on the right axial end (3) of the outer sleeve (1) and its inner polygonal formations engage with the outer polygonal formations of the sleeve (1). The stud (7) is introduced into the interior of the sleeve (1), and the nut (16) is screwed on the right axial end of the stud (7). A tool, for example a torque wrench, is applied to the expanding bolt assembly. In particular, the action force is applied by a rotating part of the tool which engages the polygonal formations (18) of the nut (16), while a reaction-absorbing part of the tool, for example an immobile reaction element, engages the polygonal formations (15) of the washer (13).

During turning of the nut (16) by the tool with absorbing the reaction by the washer (13), the inner stud is pulled to the right in FIG. 1. Due to cooperation of the tapered portion of the outer surface of the stud (7) with the tapered portion (2) of the inner surface of the outer sleeve (1), during this axial displacement the sleeve (1) expands radially outwardly. With the axial displacement of the rod (7) the flanges (25, 26) of the object are aligned with one another and clamped in an axial direction between the washer (13) and the flange (4), and the radially expanding sleeve (1) is clamped in the radial direction in the holes (23, 24) of the object, and the bolt assembly is tightened in the object.

In order to release the radially expanding bolt assembly from the object, the nut (19) is screwed on the left axial end of the stud (7) and turned by a part of the tool applying an action force, while another part of the tool, which is stationary and absorbs the reaction force, engages with the polygonal formations of the flange (4) of the sleeve (1). The nut (16) is unscrewed from the right axial end of the stud (7). During rotation of the nut (19), the stud is pulled in an opposite axial direction, the tapered portion of the outer surface of the stud (7) disengages from the tapered portion of the inner surface of the sleeve (1), so as to eliminate the radial outward pressure of the stud (7) on the sleeve (1). The outer diameter of the outer sleeve (1) is reduced and it disengages from the inner walls of the holes (23, 24) of the object (25, 26). The inventive assembly can be pulled through the openings (23, 24) to the left and removed from the object (25, 26).

It will be understood that each of the elements described above, or two or more together, may also find a useful application in other types of constructions differing from the types described above.

While the invention has been illustrated and described as embodied in a radially expanding bolt assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A radially expanding bolt assembly, comprising a hollow element insertable into a hole of an object, having an axis and expansible in a radial direction, said hollow element having an inner surface with at least one inner surface portion which is tapered; an expanding element insertable in said hollow element and having an outer surface with at least one outer surface portion which is tapered, cooperating with said inner tapered surface portion of said hollow element; additional elements configured for displacement of said expanding element in opposite axial directions for tightening the bolt assembly and for loosening the bolt assembly correspondingly said expanding element having two opposite ends engageable with said additional elements; and a washer positionable between the object and one of the additional elements at one of said axial ends, so that said one additional element displaces said expanding element in one axial direction and due to cooperation of said inner and outer tapered surface portions expands said hollow element to clamp it in the hole of the object, while the other additional element displaces said expanding element in an opposite axial direction and said inner and outer tapered surface portions disengage from one another so that said hollow element contracts and the radially expanding bolt assembly can be removed from the hole of said object, wherein said washer is non-rotatably connected with one axial end of said hollow element; and further comprising means for non-rotatably connecting said washer with said one axial end of said hollow element.

2. A radially expanding bolt assembly as defined in claim 1, wherein said expanding element has engaging formations provided on said opposite axial ends and engageable by the additional elements.

3. A radially expanding bolt assembly as defined in claim 2, wherein said engaging formations on said opposite axial ends of said expanding element include threads.

4. A radially expanding bolt assembly as defined in claim 3, wherein said additional elements are threaded nuts.

5. A radially expanding bolt assembly as defined in claim 1, wherein said means for said non-rotatably connecting said washer with said one end of said hollow element include polygonal formations.

6. A radially expanding bolt assembly, comprising a hollow element insertable into a hole of an object, having an axis and expansible in a radial direction, said hollow element having an inner surface with at least one inner surface portion which is tapered; an expanding element insertable in said hollow element and having an outer surface with at least one outer surface portion which is tapered, cooperating with said inner tapered surface portion of said hollow element; additional elements configured for displacement of said expanding element in opposite axial directions for tightening the bolt assembly and for loosening the bolt assembly correspondingly said expanding element having two opposite ends engageable with said additional elements; and a washer positionable between the object and one of the additional elements at one of said axial ends, so that said one additional element displaces said expanding element in one axial direction and due to cooperation of said inner and outer tapered surface portions expands said hollow element to clamp it in the hole of the object, while the other additional element displaces said expanding element in an opposite axial direction and said inner and outer tapered surface portions disengage from one another so that said hollow element contracts and the radially expanding bolt assembly can be removed from the hole of said object, wherein said washer has means for engaging by a tool used for turning of said one additional element and absorbing a reaction force generated during application of an action force by the tool to said one additional element.

7. A radially expanding bolt assembly as defined in claim 6, wherein said means for engaging by the tool include polygonal formations.

8. A radially expanding bolt assembly, comprising a hollow element insertable into a hole of an object, having an axis and expansible in a radial direction, said hollow element having an inner surface with at least one inner surface portion which is tapered; an expanding element insertable in said hollow element and having an outer surface with at least one outer surface portion which is tapered, cooperating with said inner tapered surface portion of said hollow element; additional elements configured for displacement of said expanding element in opposite axial directions for tightening the bolt assembly and for loosening the bolt assembly correspondingly said expanding element having two opposite ends engageable with said additional elements; and a washer positionable between the object and one of the additional elements at one of said axial ends, so that said one additional element displaces said expanding element in one axial direction and due to cooperation of said inner and outer tapered surface portions expands said hollow element to clamp it in the hole of the object, while the other additional element displaces said expanding element in an opposite axial direction and said inner and outer tapered surface portions disengage from one another so that said hollow element contracts and the radially expanding bolt assembly can be removed from the hole of said object, wherein said hollow element at said opposite axial end has a radially projecting portion.

9. A radially expanding bolt assembly as defined in claim 8, wherein said projecting portion is provided with means for engaging by a tool to absorb a reaction force generated during the application of an action force by the tool to the other additional element for displacing said expanding element in the opposite axial direction.

\* \* \* \* \*